July 26, 1938.   G. J. BLUM   2,124,726
ELEVATING DEVICE FOR AUTOMOTIVE VEHICLES
Filed Jan. 14, 1935   4 Sheets-Sheet 1
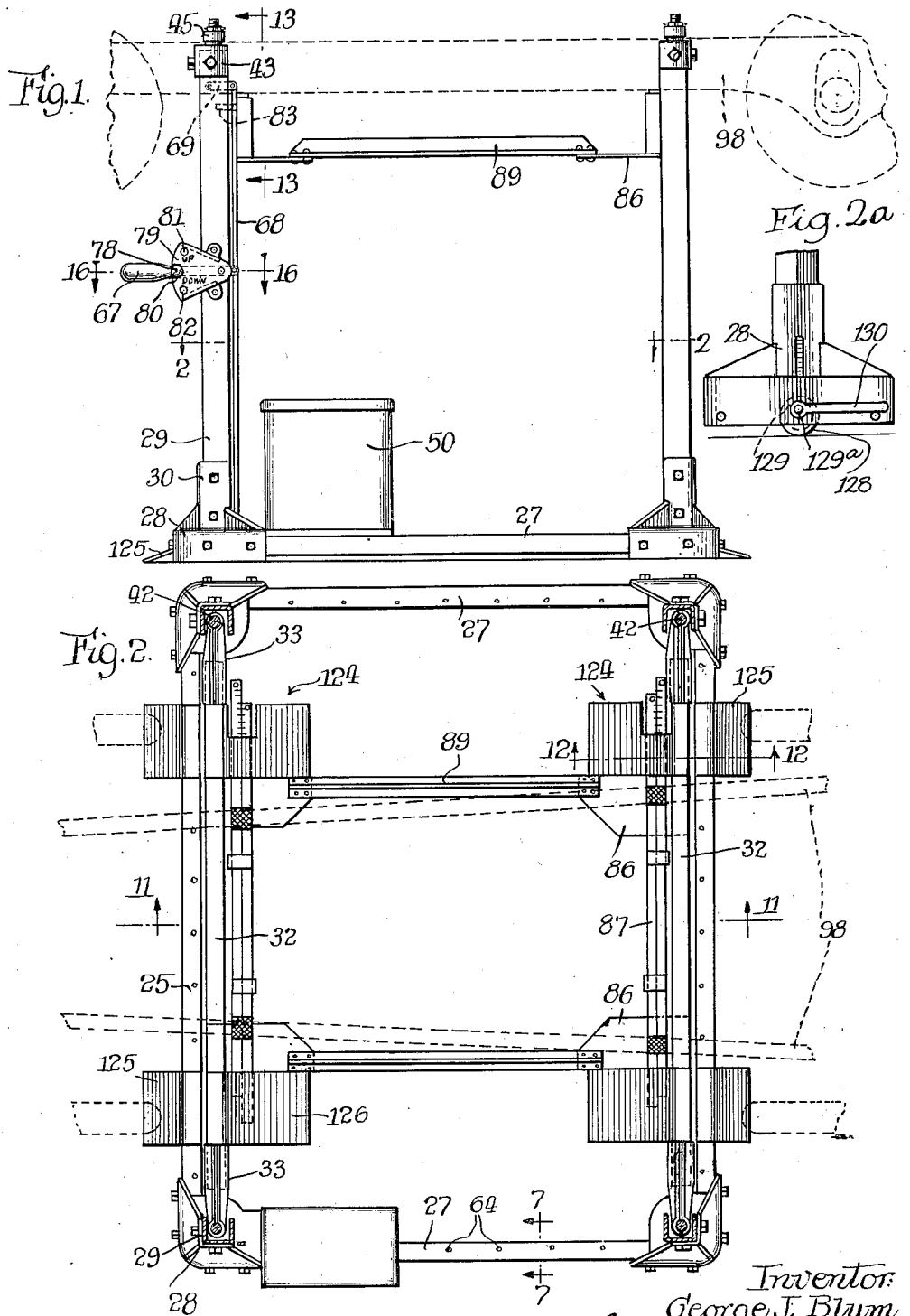

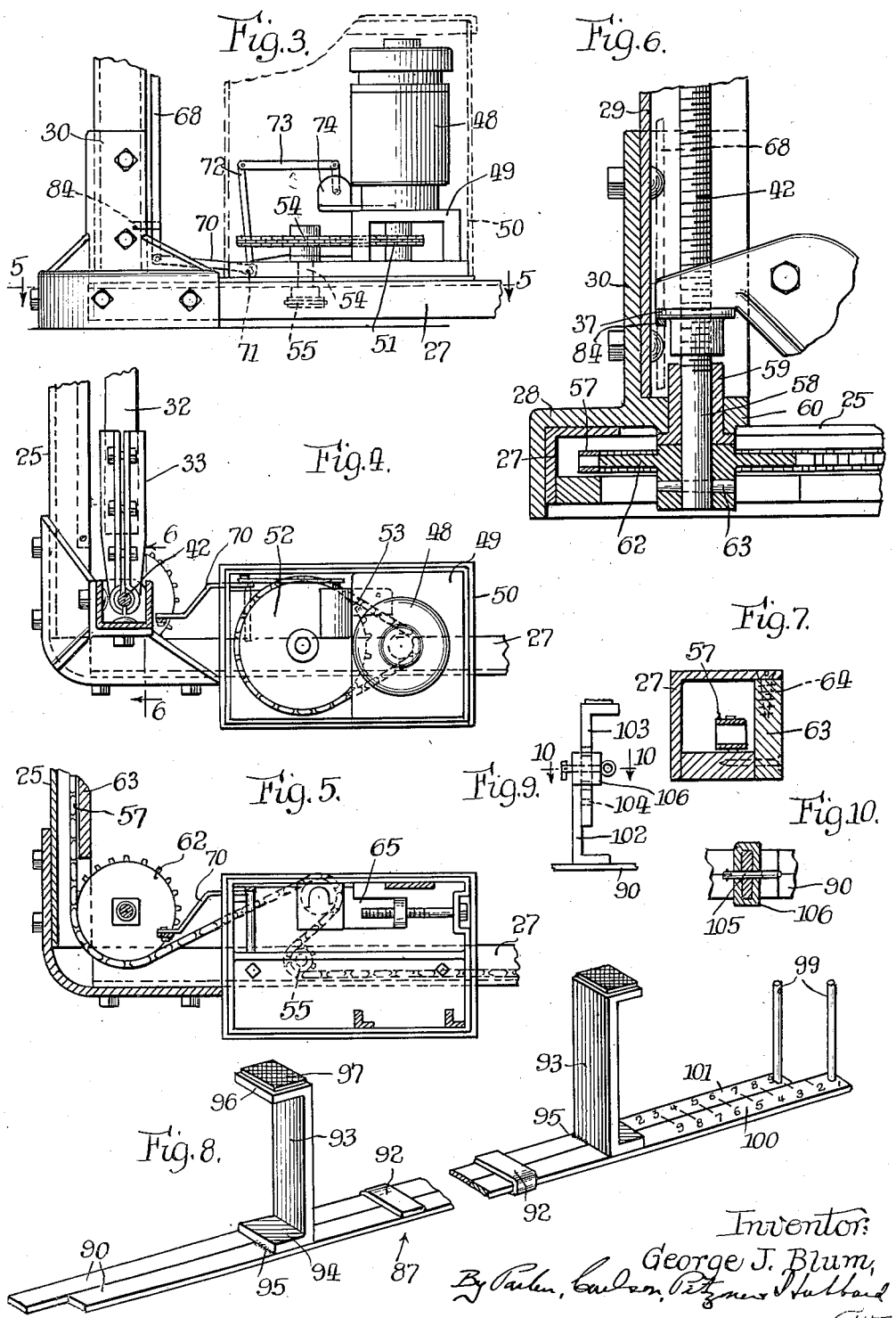

July 26, 1938. G. J. BLUM 2,124,726
ELEVATING DEVICE FOR AUTOMOTIVE VEHICLES
Filed Jan. 14, 1935 4 Sheets-Sheet 3
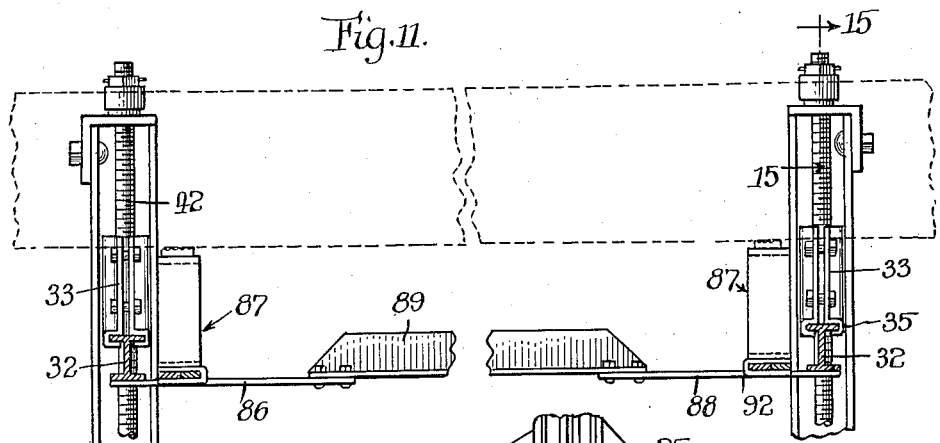
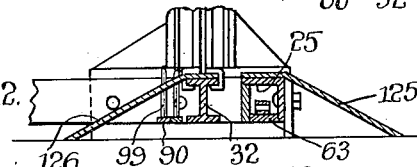
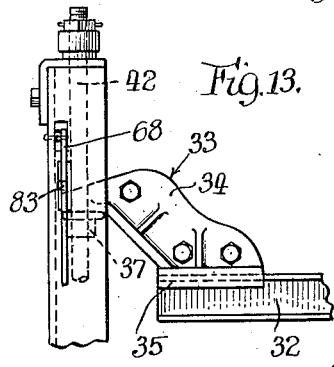
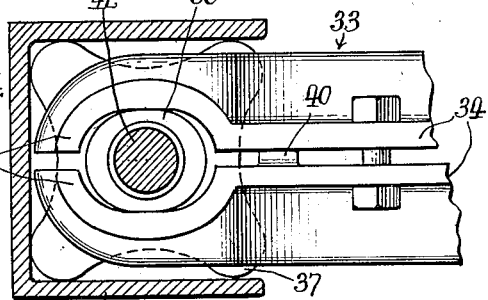
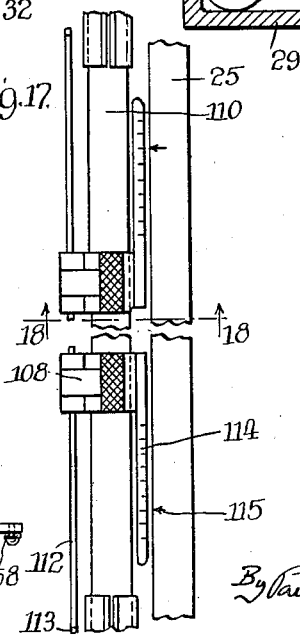
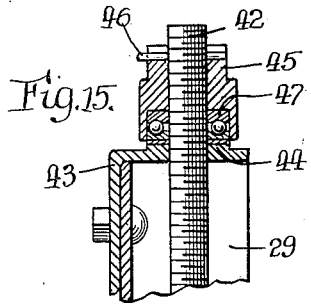
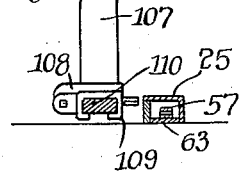
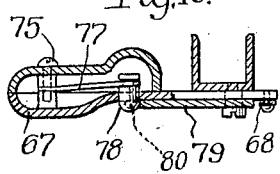
Inventor:
George J. Blum,
By Parker, Carlson, Pitzner & Hubbard
Attys.

July 26, 1938.    G. J. BLUM    2,124,726
ELEVATING DEVICE FOR AUTOMOTIVE VEHICLES
Filed Jan. 14, 1935    4 Sheets-Sheet 4
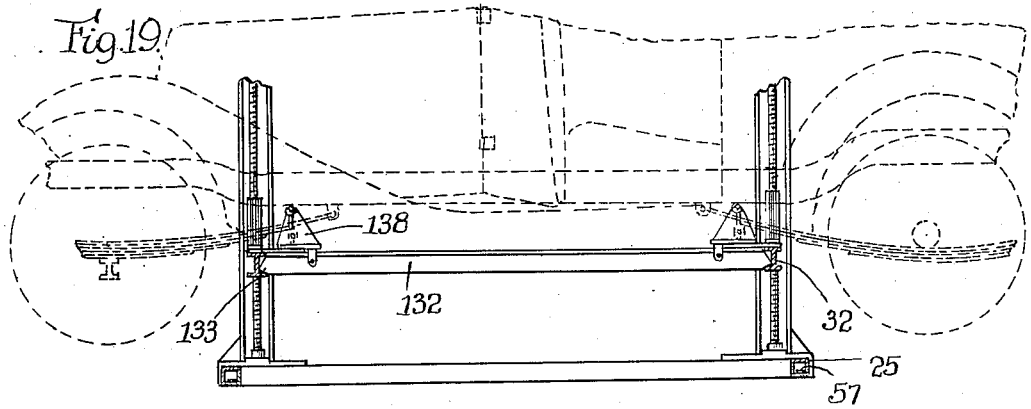
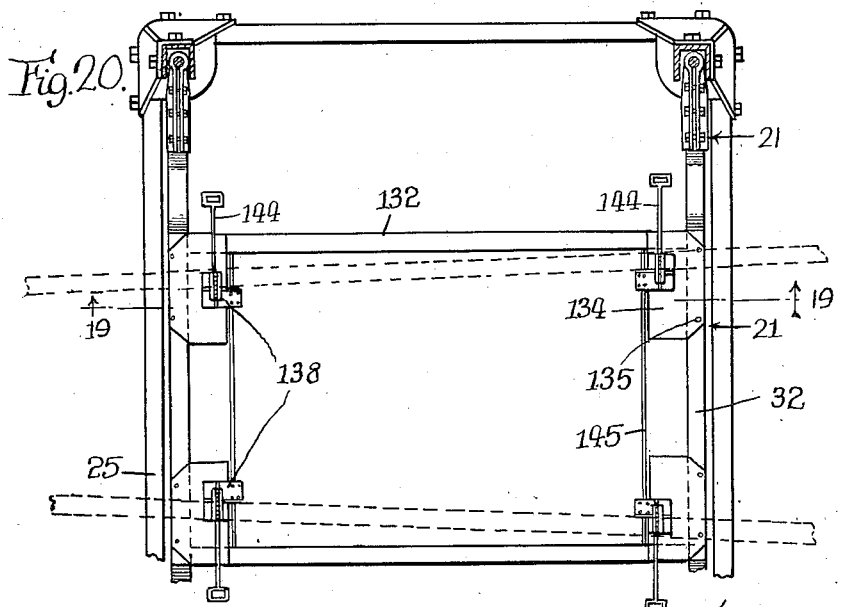
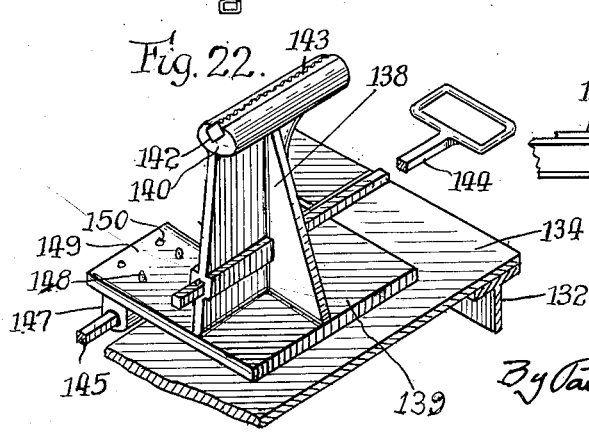
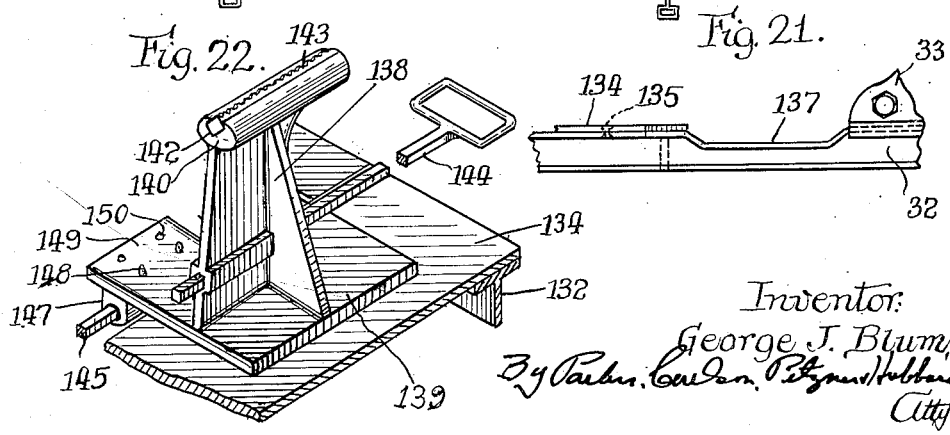

Patented July 26, 1938

2,124,726

UNITED STATES PATENT OFFICE 2,124,726

ELEVATING DEVICE FOR AUTOMOTIVE VEHICLES

George J. Blum, Chicago, Ill.

Application January 14, 1935, Serial No. 1,695

3 Claims. (Cl. 254—92)

This invention relates generally to elevating devices adapted for lifting heavy bodies a limited but substantial distance from a floor. In particular the invention relates to a novel device of this character adapted for elevating an automotive vehicle for any purpose necessitating access to the lower side thereof.

The primary object of the invention is to provide simple apparatus of novel character embodying a lifting carriage dimensioned to fit between the front and rear wheels of an automotive vehicle and having means thereon for engaging the chassis framework of the vehicle at spaced points between the axles so that the front and rear ends of the vehicle extend substantially beyond opposite sides of the carriage, the apparatus utilizing a single source of power such as an electric drive operative through simple, synchronized mechanical means to raise the carriage and vehicle a substantial distance from the floor.

Another object is to provide an elevating device including a simplified supporting carriage adapted to engage under the body of a motor vehicle to be raised, and operable by power mechanism embodying manually and automatically operated control means.

The invention also resides in the novel manner of mounting and actuating the lifting carriage of the device for smooth, uniform elevating or lowering movement.

Another object is to provide an elevating device embodying a lifting carriage actuated through the medium of a plurality of spaced screws adapted for simultaneous rotation by impelling mechanism operating through an endless sprocket chain, a housing enclosing said chain; and the other movable parts of the actuating mechanism being substantially protectively enclosed.

Another object is to provide an automobile elevating device of simplified and efficient character which is safe to operate and which embodies an arrangement wherein the vehicle doors may be opened freely and without danger of damage when entrance to the vehicle interior is desired.

Another object of the invention is to provide an elevating device equipped with novel rack mechanism cooperative with the lifting carriage and adjustable to accommodate variously dimensioned automotive vehicle chassis constructions.

Another object is to provide an elevating device of the foregoing character embodying means for selectively rendering the same portable so that the device as a whole may be shifted after an object is supported thereon.

Another object is to provide an elevating device which is of a simple and sturdy construction, is simple and efficient in operation, is susceptible of a wide range of usefulness, and may be economically manufactured and installed at low cost.

Other objects and advantages will become apparent from the following description and from the accompanying drawings, in which:

Figure 1 is an end elevation of the elevating device with the lifting carriage in its uppermost position.

Fig. 2 is a plan view partially in section taken on line 2—2 of Fig. 1 and showing the lifting carriage in its lowermost position.

Fig. 2a is a fragmentary elevational view showing one corner of the device embodying a form of mechanism selectively operable for rendering the device portable.

Fig. 3 is a fragmentary elevational view of the electric motor drive and control mechanism.

Fig. 4 is a top plan view of that portion of the apparatus shown in Fig. 3.

Fig. 5 is a sectional plan view taken substantially on line 5—5 of Fig. 3.

Fig. 6 is an enlarged sectional elevation taken substantially on line 6—6 of Fig. 4.

Fig. 7 is an enlarged sectional view taken on line 7—7 of Fig. 2.

Fig. 8 is a perspective view of an adjustable rack for use with the device.

Fig. 9 is an elevational view of a modified form of rack.

Fig. 10 is a sectional view taken substantially on line 10—10 of Fig. 9.

Fig. 11 is a fragmentary sectional elevation taken substantially on line 11—11 of Fig. 2, and showing the relationship of parts when the lifting carriage is in partially raised position.

Fig. 12 is a fragmentary sectional view taken substantially along line 12—12 of Fig. 2.

Figs. 13, 14 and 15 are detail views showing the construction of the lifting carriage supporting means and the actuating drive screw construction.

Fig. 16 is a sectional detail view of the manual control means taken substantially along line 16—16 of Fig. 1.

Fig. 17 is a fragmentary plan view of a modified form of supporting rack structure.

Fig. 18 is a sectional view taken on line 18—18 of Fig. 17.

Figs. 19 to 21 inclusive, illustrate a further modified form of the invention, Fig. 19 being taken along line 19—19 of Fig. 20 and Fig. 21 along line 21—21 of Fig. 20.

Fig. 22 is an enlarged perspective view of an improved individual rack member.

While the invention is susceptible of various modifications and alternative constructions, I have shown in the drawings and will herein describe in detail, the preferred embodiments, but it is to be understood that I do not thereby intend to limit the invention to the specific forms disclosed, but intend to cover all modifications and alternative constructions falling within the spirit and scope of the invention as expressed in the appended claims.

In a practical form, the invention may be embodied in an elevating device of simple framework construction including a lifting carriage in engagement with vertically supported screws spaced apart to receive a uniform distribution of weight and operable smoothly and rapidly to raise an automotive vehicle or the like bodily from a floor to a substantial height. Operation of the device is effected through the medium of a manually and automatically controlled power source such as an electric motor which impels an endless sprocket chain meshing over suitable sprockets fast upon the screws. For accommodating various types and sizes of automobile chassis, the lifting carriage is equipped with quickly adjustable supporting rack means of novel character, whereby the device is adapted to a wide range of usefulness. The device as a whole may be shifted around while a vehicle is in elevated position thereon by the provision of selectively operable mechanism in association with the body frame.

Referring now in detail to the examples of the invention shown in the drawings, I provide a main or stationary unit comprising a framework of angle bars, the base having spaced parallel side bars 25 and transversely extending end bars 27 joined rectangularly by corner brackets 28 bolted or otherwise secured to the bar ends. Vertical posts 29 rise from the corners of the base and are suitably secured to upstanding angular bracket extensions 30. Preferably the posts 29 are of angular cross-section herein shown as channel-shape arranged with their open faces in opposed relation so as to serve as guideways for an automobile lifting carriage.

As will be observed from Fig. 2 the base framework forms a rectangle of greatest dimension lengthwise of the bars 25, and the width is such as to permit a vehicle to straddle the frame completely with the wheels well to each side. The length of the frame is such as to freely accommodate the desired maximum vehicle body width, and since the upper part of the framework comprises only the widely separated vertical corner posts, the vehicle doors may be opened freely. Ordinarily the doors of an automobile are so located that they may be opened on either side without interference from the corner posts (Fig. 25) so that a mechanic may enter or leave the vehicle as desired after it is elevated, or the doors may be left open altogether without danger of damage.

As seen in Figs. 2 and 11, the lifting carriage comprises parallel longitudinal frame beams 32 extending between the end posts 30, supporting brackets 33 engaging the beam ends and projecting substantially into the post channels. These brackets may be fashioned alike each consisting of a pair of complementary plates 34 suitably ribbed for strength and bolted together (Fig. 14). Opposed bracket clamping jaws 35 (Fig. 13) firmly embrace the beam ends, while within the end post channels the plates rest upon means such as individual carriers or riders 37. Each of the latter is adapted to engage in non-rotatable longitudinally slidable relation within the post channel. A hub 38 formed on each rider serves to define the position of the bracket 33, the latter having opposed jaws 39 substantially embracing the hub to prevent independent lateral movement but arranged with slight longitudinal clearance to compensate for structural inaccuracies. Spacing lugs 40 may be formed on the opposed faces of the plates 34 to insure a fairly loose engagement of the rider hubs by the bracket jaws when the plates are bolted fast.

Actuating means of simple character for uniformly and smoothly reciprocally moving the lifting carriage between predetermined upper and lower limits is cooperative with the guide posts 29. In a practical form this means comprises four identical rotatable screws 42 in the form of long threaded shafts, one suspended axially within each post. In the present instance angular caps 43 (Fig. 15) are secured in any suitable manner upon the upper ends of the posts, and provide hubs 44 through which the ends of the screws project in freely rotatable manner. Means such as a hollow-face, adjustable castle nut 45 is secured upon the end of each screw for providing suspension support therefor. After the nut has been adjusted properly, it is held against rotary movement relative to the screw by means such as a cotter pin 46. Within the open face of each nut is fitted means adapted for eliminating friction and permitting rotation of the screws with minimum power expenditure even though heavy loads may be imposed thereon. This means may be a thrust bearing 47 of any suitable character, herein shown as of the ball bearing type.

The rider hubs 38 are internally screw threaded, thus adapting the riders 37 for substantial weight sustaining engagement with the screws. Since the riders are held against rotation within the end posts, it will be evident that when the screws are rotated the riders will be caused to ascend or descend at a rate proportionate to the speed of rotation and the pitch of the screw threads, the screw pitch being, of course, designed to afford maximum power transmission consistent with the desired elevating speed. By suspending all the operating weight of the screws from the top of the corner posts, the screws may be of the smallest practical diameter and no difficulty will be experienced with bending or buckling regardless of the load imposed thereon.

Power for driving the screws in unison may be obtained conveniently from any desirable source but is herein shown by way of example as derived from a reversible electric motor 48 inconspicuously arranged at one end of the device upon a mounting 49. The latter is secured at one end of the base frame upon the bar 27, and is enclosed by a suitable enclosure 50. As will be observed in Fig. 3, the motor may be supported with its axis vertical and has a driving pinion 51 upon the end of its driving shaft. A large transmission sprocket 52 is coupled with the pinion 51 in any suitable manner as by a driving chain 53. Rotatable support for the transmission sprocket is provided by a shaft 54 adjacent the motor and extending downwardly to a point below the upper surface of the frame bar 27. Fast upon its lower end, the shaft carries a sprocket pinion 55 arranged for rotation on a fixed axis and in a plane intermediate the upper and lower edges of the frame bar.

Simultaneous rotation of the screws is effected through a continuous sprocket chain 57 which passes entirely around the base of the body framework and is driven by engagement with the sprocket 55. Thus, the lower end of each screw 42 is fashioned as a journal 58 rotatable in a sleeve bearing 59 (Fig. 6). The latter may be supported rigidly in a flange 60 formed integral with the corner bracket 28. Below the bearing 59 the journal 58 has fixedly secured a sprocket 62, means such as a pin 63 maintaining the fixed relationship of the sprocket and journal. Each of the sprockets 62 is engaged by the chain 57 so that actuation of the chain will rotate each of the sprockets and thereby each of the screws 42 simultaneously.

Since the sprocket chain 57 is of substantial span between the sprockets 62, it will tend to sag toward the floor, and guard means providing a support for the chain is therefore provided. To this end, wooden strips may be secured into angular form to provide a closure or guard 63 (Fig. 7) which may be secured conveniently in suitable fashion to the base frame as by means of screws 64. If desired, the inner face of the horizontal leg of the guard 63 may be greased so as to facilitate movement of the chain thereover and to eliminate frictional noises that might arise during operation. Not only does the guard 63 serve as a support for the sprocket chain but it will also prevent the accumulation of dirt adjacent the path of the chain which might hinder its proper operation. For the purpose of regulating slack in the sprocket chain to secure the best operative results, a suitable slack adjuster 65 may be provided in conjunction with the motor mounting.

Control over the actuation of the lifting carriage is preferably effected through the medium of manual and automatic means operable for instantaneously starting or halting the motor. By way of example, a control lever 67 (Figs. 1 and 16) is pivotally secured intermediate its ends to one of the corner posts 29. At its inner end the lever is pivotally connected with a vertical push rod 68 extending from near the bottom to adjacent the upper end of the corner post. At its upper end, the push rod is pivotally connected with the corner post through the medium of a short link 69, and at its lower end pivotal connection is provided with the end of one arm of a bell crank 70 (Fig. 3). The latter is supported upon a fixed pivot 71 on the motor mounting and has an upstanding arm 72. This arm is connected with a link 73 engaging a motor switch 74. Thus, when the push rod is moved up or down a predetermined distance in either direction from an initial or neutral position, the motor switch will be actuated to start the motor. As herein shown, extreme downward movement of the push rod will start the motor to drive the screws 42 for elevating the lifting carriage while the extreme reverse movement of the push rod will reverse the motor for lowering the carriage.

Preferably the control lever 67 is of a construction that may be manipulated easily for moving the push rod 68 to the desired operative position, and is equipped with means for automatically retaining the same in such position until the lifting carriage has reached its extreme limit of travel. Thus, the handle of the lever may be hollow and formed of a pair of stampings or castings secured together by means of a bolt or screw 75. Within the handle a spring leaf 77 rigidly held at one end provides a resilient support for a finger button 78 projecting through the side of the handle and engageable with a plate 79. The latter is secured in any suitable manner to the post 29 and is provided with a central notch 80 through which the button 78 is adapted to project to lock the lever in position. When the operator wishes to move the control lever he must push the button 78 inwardly to clear the plate edge defining the notch 80. In the two operative positions of the lever, the button 78 is adapted to project into beads 81 or 82 for maintaining the lever in either position until it is returned to the neutral position after the carriage has reached the desired elevation.

Automatic control of the motor is effected through means for moving the push rod into neutral position and operable coincident with the attainment of extreme upper or lower level by the lifting carriage. By way of example, this means is shown as a finger 83 integral near the upper end of the push rod and projecting into the path of movement of the bracket 34 (Figs. 1 and 13). As the finger 83 is moved by the upwardly traveling end of the bracket the push rod will be moved until the control lever 67 is returned to neutral position and the motor is halted. A similar arrangement may be employed for returning the motor control mechanism to neutral position after the carriage has been returned to its lower level. Thus, adjacent its lower end the push rod 68 is furnished with a finger 84 (Fig. 3) projecting into the path of the rider 37 and movable thereby until the motor has been halted.

Automotive vehicle chassis are variously dimensioned and embody numerous types of construction, and an important feature of the invention resides in the provision of substantially adjustable means cooperative with the lifting carriage for supporting all types of chassis at predetermined suspension points. Desirably these suspension points are such as to permit free hanging of the wheels and connected undercarriage so that the same may be removed or worked upon freely and conveniently. Particular advantage is found in this feature when greasing and oiling the mechanism since load pressure is removed entirely from the parts and the springs, shackles and the like hang open or free.

Accordingly in one form of the invention spaced horizontal plates 86 (Figs. 1 and 11) may be secured as by welding to the carriage beams 32 in order to provide broad supports for a pair of racks 87 adjustable transversely of the vehicle to be elevated and merely resting upon the plates 86. Reinforcing struts 89 are suitably secured between opposite carriage plates and rigidify the structure for withstanding the heavy loads to which the same is subjected in use.

As seen in Fig. 8, a preferred form of the adjustable racks 87 may consist of a pair of identical flat bars 90 slidably secured edgewise in juxtaposition by means of substantially U-shaped retaining clips 92 arranged in spaced relation and secured in place by welding or otherwise affixing the legs thereof fast upon alternate bars. Identical support standards 93 having lateral flanges 94 rest upon and are welded as at 95 to alternate bars. Lateral flanges 96 at the upper ends of the standards are provided with knurled saddles 97 for non-slipping engagement at selected points with chassis frame bars 98 (Fig. 2). Near one end, each of the sliding bars 90 is provided with a handle 99 through the medium of which the bars are adjusted one relative to the other to space the supports 93 properly for receiving the chassis frame bars.

In order to facilitate adjustment of the slidable rack bars 90, the ends adjacent the handles 99 may be equipped with cooperatively arranged calibrated scales 100 and 101 by which a predetermined adjustment of the rack is possible for any known standard chassis frame bar spacing. Thus, when the operator knows the particular dimensions of any vehicle chassis, the rack may be adjusted without experimentation by setting the scales 100 and 101 to a predetermined relationship.

Often the vertical clearance of vehicle chassis will vary appreciably in different models. If desired, therefore, the rack standards may be constructed for vertical adjustment as seen in Figs. 9 and 10, each comprising a leg 102 and an adjustable head 103. The latter has a plurality of spaced apertures 104 through which a removable pin 105 is adapted to pass to retain the head in adjusted position within a guideway 106 upon the upper end of the leg.

In a modified form, the adjustable rack may be fashioned as a permanent part of the lifting carriage. As seen in Figs. 17 and 18, each rack may consist of a pair of similar parts each including a post or standard 107 secured upon a hinge plate 108. The latter is pivotally connected with a slidable clamp 109 which embraces a modified form of flat carriage beam 110. Adjustment of each of the standards upon the beam is effected by means of an adjusting rod 112 having a handle 113. In order to visualize a predetermined adjustment of the standards, each of the clamps may have secured thereto a calibrated scale 114 cooperatively arranged with a fixed indicator 115. By reason of the hinge arrangement of this form of rack the standards 107 may be tilted out of the way into horizontal position so as to clear the axle of a vehicle being positioned upon the device. Preferably the adjusting rods are secured in a manner to adapt the same for tilting the standards.

In moving a vehicle into or out of position over the lifting carriage, at least one set of wheels must pass over the base frame and the carriage beams. Where the base frame bars 25 are comparatively narrow and the carriage beams 110 are likewise narrow as seen in Fig. 18, the wheels will pass thereover without difficulty. However, where the framework and carriage beams are relatively wide, I provide ramps 124 (Fig. 2) to facilitate the passage of the wheels thereover. Each of these ramps may consist, as seen in Fig. 12, of a gently sloping ramp plate 125 secured to the frame bar 25 and a ramp plate 126 secured in suitable fashion to the top of the carriage beam 32. Thus, the wheels may pass over the structure smoothly and without jarring.

Desirably the elevating device may embody means for rendering the same portable as a unit before or after a vehicle is supported thereon. One expedient suitable for the accomplishment of this purpose consists in providing retractible wheels or rollers 128 in each of the corner angles 28 (Fig. 2a). Thus, each of the rollers 128 may be rotatable upon a shaft or axle 129 having eccentrically disposed offset end portions 129a which are journaled in the side walls of the housings surrounding the rollers 126. To facilitate rotation of the framework of the vehicle lifting device (shown in plan in Fig. 2) about its central vertical axis of symmetry, the axes of the several roller shafts 129 are disposed in a horizontal plane and extending perpendicular to, that is, radially outward from, the said vertical axis of symmetry of the framework. The outer ends of the shafts may be arranged to be engageable by a manual operating lever 130 adapted for moving the rollers into or out of operative position. This feature is of particular value for repair work or the like where ordinarily the device should rest immovably, but it may become desirable to revolve the same to bring that part of the vehicle upon which repairs are to be made adjacent to a source of light or into a convenient position relative to a tool bench. If desired, the device may be equipped with roller means adapting the same for longitudinal or side shifting movement.

If desired, the invention may embody individual portable rack members and the slightly modified construction shown in Figs. 19 to 22, inclusive. In this form, the lifting carriage includes the beams 32 and transverse, spaced, parallel bars 132, herein shown as T-bars although channels or other desirable shapes may be used. As seen in Fig. 19, the ends of each bar 132 are fashioned to provide shoulders 133 adapted to engage within the inner channels of the parallel I-beams 32, resting securely upon the lower channel flange. Welded or otherwise secured to the upper face of each end of the transverse carriage bars 132 is a rack plate 134 extending into overlapping relation with the adjacent beam 32 where the plate may be secured by bolts 135. Through this arrangement the transverse bars are held against displacement but may be removed when desired. Moreover, when transporting the device from one place to another the disassembled carriage bars and beams are adapted to form a compact bundle requiring little space.

Preferably the base frame bars 25 are as shallow as is consistent with operation of the chain 57, whereby an automobile wheel will conveniently pass over the frame without the aid of a ramp. For practical reasons, however, the carriage beams are generally of heavier structure than the frame bars and means must be provided for moving a vehicle wheel thereover. In the present instance I accomplish this by forming wheel passes 137 (Fig. 21) in the upper faces of the beams 32 beside each rack plate 135. The edges of the rack plates and the outer edges of the bars 132 will guide the vehicle wheels and prevent them from passing over the bars.

Individual racks 138 formed principally as a single strong but light casting may be utilized for engaging the chassis framework of an automotive vehicle. Preferably the rack body includes a large flat base 139 and a head 140 substantially above but extending freely to one side over said base, adapting the head to fit under the chassis frame over a spring as seen in Fig. 19.

Since the chassis frames of different vehicles vary widely in cross section and longitudinal shape, I provide means on the head for gripping and sustaining the same even under extreme circumstances. Thus, a channel 142 is formed in the rack head and a hardened metal bar 143 is fitted or driven into the channel. As seen in Fig. 22, the bar 143 may be square and secured in the head with one corner serrated and placed uppermost whereby the adjacent portions of the head may be fashioned to embrace and grip the lateral corners of the horizontal bar. Thus equipped the rack may be used safely even where the chassis frame is of round cross section or curved longitudinally.

For conveniently manipulating the racks 138, each may be provided with a handle 144. The latter may be of substantial length and of polygonal cross section, slidably mounted in the rack. Thus, the handle may be extended or shortened at will and a slight rotary manipulation thereof will bind the same for moving the rack. By further rotating the handle, the rack may be tilted over to afford unobstructed passage for a vehicle undercarriage of low clearance.

If desired, means may be provided for retaining the racks in position for quick replacement when they have been tilted out of the way. To this end a pivotal bar 145 may be mounted to one side of and below the level of the rack plate 134. Slidable on this bar is a saddle 147 provided with upstanding pins 148. An extension 149 on the rack base 139 has apertures 150 adapted to receive the pins so that when the rack is tilted it will pivot about the axis of the bar 145. Should the rack not be tilted out of way and thus be in the path of a low hanging part of a moving vehicle, the extension will leave the pins 148 with which it is only in frictional or similar non-permanent connection and damage to the rack member is avoided.

In operation, a vehicle will be moved into position over the elevating carriage and the supporting rack means adjusted to the particular dimensions of the vehicle chassis. The operator will then actuate the control lever 67 clockwise as seen in Fig. 1 and the motor 48 will be started to activate the power transmission mechanism embodying the screw rods 42. Rotation of the latter causes the riders 37 to move upwardly thereon to elevate the carriage and lift the vehicle.

The operator may halt the carriage at any point of elevation he desires or he may allow the carriage to move to its uppermost limits where the same will be stopped automatically when the finger 83 is engaged to actuate the control mechanism for halting the motor. To reverse the motor for lowering the carriage, the control lever 67 will be moved counterclockwise; and the operator may halt the descent at will or he may permit the carriage to assume its lowermost position where the motor will be automatically stopped by engagement of the control finger 84. If the operator wishes to shift the device either before or after a vehicle is in position, he may do so upon throwing into position the rollers 128 by which the device as a whole may be shifted with only slight effort.

From the foregoing it will be apparent that I have provided a simple and efficient elevating device that may be economically constructed as a compact unit embodying relatively few and simple parts, and that is adapted to accommodate vehicles of various structural characteristics. A vehicle elevated by the device cannot fall because even though the rack means directly supporting the same may slip, the carriage structure will receive the chassis and retain the vehicle in upright elevated position. Neither can the vehicle roll off the lifting carriage because the latter is relatively narrow and the vehicle wheels depend substantially to each side thereof. Hence a mechanic may safely work under the vehicle or get into the interior thereof. Since only widely separated corner posts are used in the upper framework of the device, the vehicle doors may be opened without damage. Furthermore, the framework as a whole is so scant as to afford practically no interference to free visibility and accessibility under an elevated vehicle. If desired suitably positioned lights may be arranged upon the framework to illuminate thoroughly the vehicle underside.

I claim as my invention:

1. In a device adapted for elevating an automotive vehicle, a lifting carriage including spaced plates adapted to underlie a vehicle chassis frame, a rack member supported by each of said plates and comprising a body including a flat base and an inverted L-shaped head and supporting arm, said head over-lying said base in spaced relation thereto whereby to permit engagement of a chassis member over a vehicle spring or the like, and means on said head for non-slipping engagement with said chassis member.

2. In a device adapted for elevating an automotive vehicle or the like including a lifting carriage having a flat platform, a rack member comprising a flat bottom base resting on said platform, means rising vertically from said base to a substantial height and adapted for engaging a chassis member, means for tilting said member on its side out of position relative to said platform, an extension at one side of said base, and means pivotal upon an axis in a plane below said platform and at one side thereof adapted for detachably engaging said extension for guiding said member relative to said platform when moving the same into or out of position thereon, the connection between said means and extension being detachable when substantial pressure other than tilting pressure is exerted upon said rack member.

3. A lifting rack for motor vehicles comprising a carriage in the form of a skeleton frame dimensioned so as to be received horizontally between the front and rear wheels of a vehicle to be elevated, said carriage having two rigid cross beams and a pair of bars connecting the beams in spaced parallel relation, said beams being of a length such that the opposite ends terminate a short distance beyond the opposite sides of the body of such vehicle, means for supporting said carriage for up and down movements including a substantially rectangular supporting structure having four corner posts arranged in pairs disposed on opposite sides of the vehicle body with the posts of each pair spaced apart longitudinally of the vehicle a distance less than the relative spacing of the vehicle axles, synchronously driven elevating devices for the carriage associated with the respective posts, said cross beams of the carriage having their ends terminating adjacent said posts and connected with the elevating devices thereof, flat plates supported at the junctions of the cross beams and connecting bars and forming a connection therebetween, and jacks on said plates horizontally adjustable relative thereto for engaging the vehicle chassis frame, whereby when the carriage is elevated the vehicle is supported centrally thereof with its opposite end portions including the motor, wheels and suspension means therefor projecting exteriorly of the rack in overhanging relation thereto and wholly unobstructed by the rack.

GEORGE J. BLUM.